Feb. 28, 1933.   W. A. STEVENS   1,899,649
SYSTEM OF CONTROL FOR ELECTRICALLY DRIVEN VEHICLES
Original Filed Feb. 27, 1930
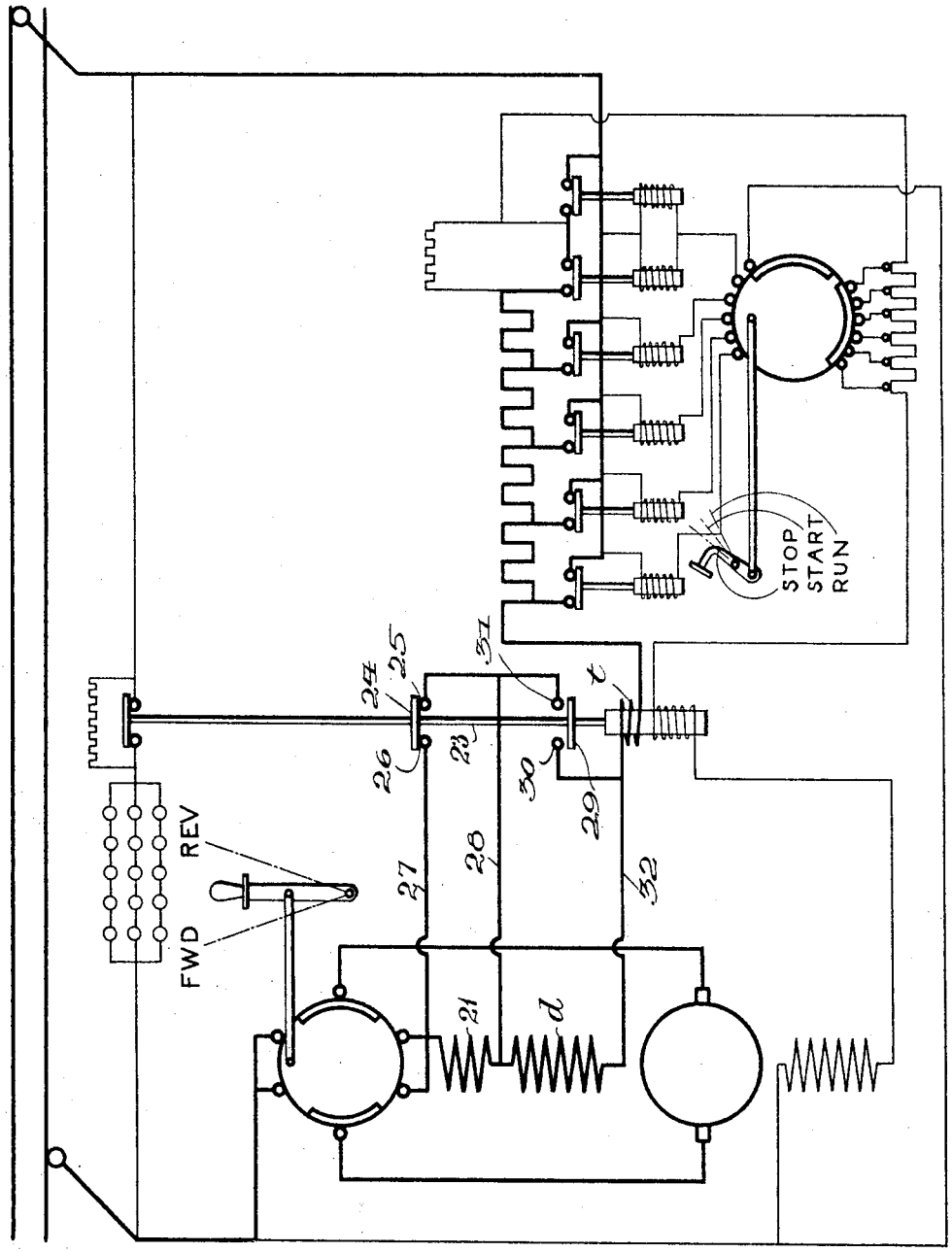
INVENTOR
William A. Stevens
by Richard E. Babcock
Attorney Patented Feb. 28, 1933

1,899,649

UNITED STATES PATENT OFFICE

WILLIAM ARTHUR STEVENS, OF MAIDSTONE, ENGLAND, ASSIGNOR TO GUY MOTORS LIMITED, OF WOLVERHAMPTON, ENGLAND, A COMPANY OF GREAT BRITAIN

SYSTEM OF CONTROL FOR ELECTRICALLY DRIVEN VEHICLES

Original application filed February 27, 1930, Serial No. 431,855, and in Great Britain December 19, 1929. Divided and this application filed March 25, 1931. Serial No. 525,224.

This application is filed as a division of my application Ser. No. 431,855, filed February 27, 1930, for electrically driven vehicles.

This invention relates to electrically propelled vehicles of the kind known as trolley vehicles, battery vehicles and petrol-electric vehicles in which the driving motor receives current from overhead trolley wires or from a battery on the vehicle or from a dynamo driven from an internal combustion engine on the vehicle.

More particularly the invention relates to vehicles of the kind referred to in which the driving motor is a dynamo-electric machine of the regenerative type, that is to say, of the kind which will absorb electrical energy when acting as a motor but will, when the vehicle is descending a steep hill or is being retarded on the level, act as an electric generator, and which, when the electromotive force then set up, exceeds that of the current supply line or battery, can be used to return current to such source of current supply, hereinafter referred to as the current supply line.

A compound wound dynamo electric machine of the kind referred to, comprises, broadly, a field magnet provided with a series field winding having in series therewith a variable starting resistance, and a shunt field winding having in series therewith a variable resistance, an armature, a switch device for connecting and disconnecting one or other of the armature brushes to and from one of the poles of the current supply line, and for reversing the direction of the current through the armature in order to reverse the direction of running of the machine, and pedal or hand operated circuit controlling means for connecting the remote ends of the shunt field resistance and series field starting resistance to the other pole of the current supply line and for successively short circuiting portions of the starting resistance for starting up the motor, and for short circuiting and open circuiting portion of the shunt field resistance for varying the speed of the motor to suit varying requirements, all as well understood.

When a vehicle provided with such a machine is descending a hill and the pedal or hand lever (hereinafter called the power pedal) used for operating the circuit controlling means is in its middle position with the variable resistances in circuit with the series and shunt field windings both short-circuited, the machine will, at a certain speed, set up a counter-electromotive force exceeding that of the current supply and become a generator, returning current to the current supply line. As this current has to traverse the series field winding in a direction which tends to demagnetize and oppose the magnetic field set up by the shunt field winding, the action is thus differential, the field set up by the shunt field winding predominating. It will thus be seen that the field strength when the dynamo-electric machine is acting as a generator is due to the difference between the number of ampere turns in the shunt and series field windings, the return current being limited to an extent which will not unduly weaken the field.

On moderate hills, this arrangement works quite satisfactorily, the retardation being very smooth, and a useful current up say to about 60 amperes at 500 volts may be returned to the current supply line. On very steep down gradients, however, the reverse current returned to the current supply line so weakens the field, owing to the demagnetizing effect of the series field winding, which winding the said current must traverse, that the machine cannot return sufficient current to enable it to act as a brake and effectually retard the vehicle so that it shall travel at reasonable speeds.

To meet this objection it has already been proposed, in a machine of the kind referred to, to provide means by which the series winding of a compound-wound dynamo-electric machine can be automatically shunted when regeneration is taking place, so that the demagnetizing action of the series winding can be reduced, the excitation of the machine being maintained by the shunt winding.

A shunt wound machine, however, has, as is well known, a falling characteristic and the field strength is further weakened by the small amount of current through the series winding, due to the impossibility of absolutely short-circuiting this winding. The regenerative, or braking effect, therefore, is not so effective as if the voltage at the terminals of the dynamo-electric machine, when acting as a generator, is kept at a level value, whatever the amount of current generated.

The present invention has for its object to provide that the dynamo-electric machine shall be kept at a level, or nearly level, characteristic, and consists in the provision of a few turns of series winding (hereinafter termed the "auxiliary series winding") wound in a counter direction to the main series winding (hereinafter termed the "original series winding"). These two windings are connected in series and the arrangement is such that when the machine is acting as a generator the original series winding is short-circuited and at the same time the auxiliary series winding is inserted in the circuit so as to increase the strength of the field maintained by the shunt winding. When the machine again commences to act as a motor the auxiliary series winding is short-circuited and the original series winding again inserted in the circuit.

Means are also provided for safeguarding the lighting circuit of the vehicle against excessive voltage when the machine is regenerating strongly.

The means whereby according to this invention the dynamo-electric machine can be kept at a level or nearly level characteristic is shown in the accompanying diagram where it will be seen that there is associated with the original series winding d an auxiliary series winding 21 wound in a counter direction to the winding d. These two windings are connected together in series. 23 is the moving member of a two-way switch which is adapted for operation by means responsive to change of direction of current through the armature. A bridging member 24 carried by the member 23 is adapted to close the contacts 25 and 26 when the machine is operating as a motor. When the contacts 25 and 26 are closed the auxiliary series field winding 21 is short-circuited by means of the conductors 27 and 28. A bridging member 29 also carried by the member 23 is adapted to bridge the contacts 30 and 31 when the current in the armature of the machine reverses by reason of the generator action. In this position the main series field winding d is short-circuited by means of the conductors 28 and 32. When the machine is acting as a motor the contacts 30 and 31 are normally open and the contacts 25 and 26 are closed by bridge 24, and when the machine is acting as a generator the contacts 30 and 31 are closed by bridge 29 and the contacts 25 and 26 are open. In the latter case the current through the auxiliary series winding will tend to increase the strength of the field maintained by the shunt winding.

The two-way switch 23 may be operated by a reverse current switch one coil $t$ of which is connected in series with the main circuit and the other coil in series with the shunt circuit of the dynamo-electric machine. The two-way switch may be further arranged so that when the machine is generating and the original series winding is short-circuited a resistance is inserted into the lighting circuit of the vehicle, this resistance being automatically short-circuited when the machine again commences to act as a motor.

Alternatively the closing and opening of the circuits may be effected by means of a contactor operated by means of a reverse current relay with the addition of another auxiliary switch which will close when the main contactor switch opens and will then short-circuit the auxiliary series winding when the dynamo-electric machine is motoring.

By the above described means the speed at which the dynamo-electric machine will continue to regenerate will be reduced as the effect of the current through the auxiliary series winding 21 will be added to that of the shunt field winding.

What I claim and desire to secure by Letters Patent of the United States, is,

1. In an electrically propelled vehicle, in combination, a dynamo-electric machine having an armature, a shunt field winding, a main series field winding and an auxiliary series field winding wound with a different number of turns and in a direction opposite to said main series field winding, a circuit adapted when closed to short-circuit said main series field winding, a second circuit adapted when closed to short-circuit said auxiliary series field winding, and means associated with said machine operably responsive to the direction of the current in said armature to open said first mentioned circuit and to close said second mentioned circuit when the machine is acting as a motor and to close said first mentioned circuit and to open said second mentioned circuit when the machine is acting as a generator.

2. In an electrically propelled vehicle, in combination, a dynamo-electric machine having an armature, a shunt field winding, a main series field winding and an auxiliary series field winding wound with a lesser number of turns and in a direction opposite to said main series field winding, a circuit adapted when closed to short-circuit said main series field winding, a second circuit adapted when closed to short-circuit said auxiliary series field winding, and means associated with said machine operably responsive to the direction of the current in said armature to open said first mentioned circuit and to close said second mentioned circuit when the machine is acting as a motor and to close said first mentioned circuit and to open said second mentioned circuit when the machine is acting as a generator.

In testimony whereof, I have signed my name to this specification at London England this 13th day of March 1931.

WILLIAM ARTHUR STEVENS.